United States Patent [19]
Radwanski et al.

[11] Patent Number: 6,153,544
[45] Date of Patent: *Nov. 28, 2000

[54] FLAME INHIBITOR COMPOSITION AND METHOD OF APPLICATION

[75] Inventors: Fred Robert Radwanski; Henry Skoog, both of Roswell; Terry Ray Cleveland, Woodstock; Phillip Sherman Warren; William Francis Cartwright, both of Roswell, all of Ga.

[73] Assignee: Kimberly-Clark Worldwide, Inc., Neenah, Wis.

[ * ] Notice: This patent is subject to a terminal disclaimer.

[21] Appl. No.: 09/044,895

[22] Filed: Mar. 20, 1998

Related U.S. Application Data

[62] Division of application No. 08/575,374, Dec. 20, 1995, Pat. No. 5,912,196.

[51] Int. Cl.$^7$ ..................................................... B32B 9/04

[52] U.S. Cl. ......................... 442/153; 442/139; 442/140; 442/141; 442/142; 442/143; 442/144; 442/145; 442/146; 442/147; 442/165; 442/171; 442/400; 442/401; 442/414

[58] Field of Search ................................. 442/153, 139, 442/140, 141, 142, 143, 144, 145, 146, 147, 165, 171, 400, 401, 414

[56] References Cited

U.S. PATENT DOCUMENTS

| | | | |
|---|---|---|---|
| 3,257,267 | 6/1966 | Hay | 162/159 |
| 3,620,797 | 11/1971 | Feitlowitz | 117/7 |
| 3,637,409 | 1/1972 | Hartman | 117/7 |
| 3,658,579 | 4/1972 | Ottinger et al. | 117/137 |
| 4,001,477 | 1/1977 | Economy et al. | 428/224 |
| 4,035,542 | 7/1977 | Rosenthal et al. | 428/224 |
| 4,284,682 | 8/1981 | Tschirch et al. | 428/263 |
| 4,307,148 | 12/1981 | LeBlanc | 428/275 |
| 4,374,888 | 2/1983 | Bornslaeger | 428/198 |
| 4,448,841 | 5/1984 | Glass et al. | 428/270 |
| 4,451,262 | 5/1984 | Mayer et al. | 8/125 |
| 4,501,792 | 2/1985 | Holmes et al. | 428/299 |
| 4,705,712 | 11/1987 | Cashaw et al. | 428/152 |
| 4,750,443 | 6/1988 | Blaustein et al. | 112/420 |
| 4,794,037 | 12/1988 | Hosoda et al. | 428/264 |
| 4,822,667 | 4/1989 | Goad et al. | 428/265 |
| 4,824,483 | 4/1989 | Bumpus | 106/18.12 |
| 4,863,764 | 9/1989 | Davis et al. | 427/393.3 |
| 4,863,797 | 9/1989 | Ichibori et al. | 428/359 |
| 4,879,168 | 11/1989 | McCullough, Jr. et al. | 428/224 |
| 4,888,136 | 12/1989 | Chellapa et al. | 252/607 |
| 4,892,769 | 1/1990 | Perdelwitz, Jr. et al. | 428/68 |
| 4,902,564 | 2/1990 | Israel et al. | 428/284 |
| 4,908,160 | 3/1990 | Thacker | 252/608 |
| 4,909,805 | 3/1990 | Smith | 8/127.1 |
| 4,965,301 | 10/1990 | Leininger | 524/101 |
| 5,011,731 | 4/1991 | Nakamori et al. | 428/222 |
| 5,026,587 | 6/1991 | Austin et al. | 428/91 |
| 5,069,889 | 12/1991 | Misra | 423/306 |
| 5,104,703 | 4/1992 | Rachman et al. | 428/35.6 |
| 5,108,827 | 4/1992 | Gessner | 428/219 |
| 5,198,293 | 3/1993 | Metrick | 428/290 |
| 5,208,105 | 5/1993 | Ichibori et al. | 428/373 |
| 5,229,184 | 7/1993 | Campbell et al. | 428/113 |
| 5,236,769 | 8/1993 | Paire | 428/196 |
| 5,252,386 | 10/1993 | Hughes et al. | 428/224 |
| 5,284,703 | 2/1994 | Everhart et al. | 428/283 |
| 5,292,581 | 3/1994 | Viazmensky et al. | 428/288 |
| 5,348,796 | 9/1994 | Ichibori et al. | 428/224 |
| 5,389,202 | 2/1995 | Everhart et al. | 162/103 |
| 5,397,509 | 3/1995 | Kostrzecha | 252/607 |
| 5,407,739 | 4/1995 | McCullough et al. | 428/287 |
| 5,486,381 | 1/1996 | Cleveland et al. | 427/294 |
| 5,578,124 | 11/1996 | Cleveland et al. | 118/50 |

FOREIGN PATENT DOCUMENTS

| | | |
|---|---|---|
| 503686 | 6/1954 | Canada . |
| 2051774 | 3/1992 | Canada . |
| 0471313A2 | 2/1992 | European Pat. Off. . |
| 0476644A1 | 3/1992 | European Pat. Off. . |
| 501080 A1 | 9/1992 | European Pat. Off. . |
| 0272671 A1 | 10/1989 | Germany . |
| 658107 | 10/1951 | United Kingdom . |
| 2 077 310 | 12/1981 | United Kingdom . |
| 92/07984 | 5/1992 | WIPO . |
| 94/04739 | 3/1994 | WIPO . |

OTHER PUBLICATIONS

1481251 A Soviet Union (Abstract Only); AS Belo Gen Inor Ch; Fire Fighting Management; May 23, 1989.

49–94976 Japan (Abstract Only); Sekiguchi, T; Sep. 9, 1974.

50–15821 Japan (Abstract Only); Matsushita Elec Ind KK; Jun. 7, 1975.

2073597 Japan (Abstract Only); Furukawa Electric Co.; Jun. 20, 1977.

1141786 Japan (Abstract Only); Toyo Soda Mfg KK; Jun. 28, 1986.

2231074 Japan (Abstract Only); Murata T; Oct. 9, 1987.

2850496 Germany (Abstract Only); Alby Klorat AB; May 31, 1979.

2945597 Germany (Abstract Only); Zajonz A; May 21, 1981.

Kirk–Othmer, "Phosphorus Flame Retardants", Encyclopedia of Chemical Technology, vol. 10, 1993, pp. 976–993.

"Phosphorus–Containing Polymers", Encyclopedia of Polymer Science and Engineering, vol. 11, 1988, pp. 96–111.

"Monographs", CTFA Cosmetic Ingredient Handbook, 1992, p. 464.

"What you need to know about flame retardants . . . ", Plastics Formulating & Compounding, Oct./Nov. 1995, pp. 56–58, 60.

(List continued on next page.)

*Primary Examiner*—Helen L. Pezzuto
*Attorney, Agent, or Firm*—Nelson Mullins Riley & Scarborough

[57] ABSTRACT

A flame retardant composition for treating a high pulp content nonwoven web is provided. The flame retardant composition includes soluble solids formed from inorganic salts, such as ammonium polyphosphate and sulfur. The TGA range of such soluble solids is from about 175° C. to about 370° C. The flame retardant composition may be continuously and uniformly applied to the high pulp content nonwoven web by a non-compressive process.

12 Claims, 1 Drawing Sheet

OTHER PUBLICATIONS

"Food Additives", Food Chemistry, Second Edition, Revised and Expanded, 1985, pp. 671, 638–640.

R. A. Mount, et al., "Phosphates As Flame Retardant Additives", Presented at The Global Outlook for Environmentally Friendly Flame Retardant Systems, Dec. 3, 1990, pp. 1–8.

Y. Sekiguchi, et al., "The Effect of Inorganic Additives on the Formation, Composition, and Combustion of Cellulosic Char", Journal of Applied Polymer Science, vol. 29, 1984, pp. 1267–1286.

J.M. Church, "Flammability Hazards Of Fabrics", Chemical and Engineering News, vol. 31, No. 4, Jan. 26, 1953, pp. 325–329.

H.L. Vandersall, "Fire Resistance Through Phosphorus-–Catalyzed Intumesence", Research Department, Inorganic Division, Monsanto Company, 1990, pp. 1–27 and 25 pgs. of attachments.

M.A. Kasem, et al., "Flame–Retardants for Fabrics", Ind. Eng. Chem. Prod. Res. Develop., vol. 11, No. 2, 1972, pp. 114–133.

E.R. Larsen, et al., "On The Mechanism Of Hologen's Flame Suppressing Properties", Journal of Fire & Flammability, vol. 10 (Jan. 1979), pp. 69–77.

J. Green, et al., "Flame Retarding Plastics With Halogen–Containing Compounds", JFF/Fire Retardant Chemistry, vol. 1 (Nov. 1974), pp. 185–204.

M.A. Kasem, et al., "Flammability And Flame Retardancy Of Fabrics: A Review", Fire and Flammability Series, vol. Nine, 1974, 9 pgs.

F. Shafizadeh, "Thermal degradation of cellulose", The Chemistry of Solid Wood, vol. 11, 1984, pp. 266–289.

Kirk–Othmer, "Anionic Surfactants", Encyclopedia of Chemical Technology, vol. 12, Third Edition, 3 pgs.

M.J. Collie, "Corrosion Inhibitors—Developments Since 1980", Noyes Data Corporation, 1983, 7 pgs.

P.A. Schweitzer, P.E., "Corrosion Resistance Tables—Metals, Plastics, Nonmetalics, and Rubbers", $2^{nd}$ Edition, 1986, 6 pgs.

P.A. Schweitzer, P.E., "Corrosion and Corrosion Protection Handbook", $2^{nd}$ Edition, 1989, pp. 47–51.

"Flame Retardants—Product Information", Spartan Flame Retardants, Inc., 1983, pp. 1–17.

T. Sato, et al., "Synthesis Of Hydrotalcite–Like Compounds And their Physico–Chemical Properties", Reactivity of Solids (1988), vol. 5, pp. 219–228.

"Phos–Check® P/30 Paper Fire Retardant, Technical Bulletin", Phos–Chek:Reg. T.M. Monsanto Company, 9 pgs.

K.K. Shen, "Borates As Fire Retardants—A Review", Presented at The Global Outlook for Environmentally Friendly Flame Retardant Systems, Dec. 2–4, 1990, 12 pgs.

"Pyroset® TPC flame retardant", American Cyanamid Company, Bulletin 909–4–024 5h Sep. 1990, 3 pgs.

"Multi–Functional Characteristics of Soluble Silicate", The PQ Corporation, Bulletin 17–101, 1991, pp. 1–12.

M. Huber, "Silicone Flame Retardant: Trends & Developments", Presented at The Global Outlook for Environmentally Friendly Flame Retardant Systems, Dec. 2–4, 1990, 15 pgs.

"AMGARD®CL Ammonium Polyphosphate Solution", Technical Bulletin Issue MTH091494, 1994, 2 pgs.

"AMGARD® MC Flame Retardant" Issue No. CLG102694, Albright & Wilson Americas, Inc., 1994, 6 pgs.

"Phos–Check® P/30 Fire Retardant", Technical Bulletin, Publication 9177, Monsanto Company, 1992, 4 pgs.

"Phos–Chek® P/30—Phosphorus–based Fire Retardant", Technical Bulletin No. 9189, Monsanto Company, 1993, 12 pgs.

"Exolit® 422", Exolit® Flame Retardant, Hoechst Celanese Corporation, 1996, 2 pgs.

"Material Safety Data Sheet" for Hostaflam® AP 422, Hoechst Celanese Corporation, version date: Feb. 2, 1993, date printed: Dec. 4, 1995; pp. 1–3.

"Flame Retardants Buyers Guide", American Dyestuff Reporter, Jan. 1996, pp. 15–31.

D. Scharf, "Intumescent Fire Retardants For Plastics—A Continuance", presented at Fire Retardant Chemical Associate Meeting—Kiawah, S.C., Oct. 1992, 11 pgs.

D.E. Lyman, "Mild Steel Corrosion Studies on FRX–42", Virginia Chemical Ref. 1567–90, Jun. 10, 1976, 8 pgs.

"Analysis of Flame Retardant Chemical", Test Report No. LA 73391, United States Testing Company, Inc., California Division, Aug. 3, 1987, pp. 1–10.

"Human Skin Tests With Flame Retardants X–12 and CM and 'Quilon'", Medical Research Project No. MR–278, Haskell Laboratory for Toxicology and Industrial Medicine, May 20, 1954, pp. 1–3.

M.M. Hirschler, "Soot From Fires: II. Mechanisms of Soot Formation", Journal of Fire Sciences, vol. 3, Nov./Dec. 1985, pp. 380–414.

M.M. Hirschler, "Soot From Fires: III. Soot Suppression", Journal of Fire Sciences, vol. 4, Jan./Feb. 1986, pp. 42–71.

F. Molesky, "A Close Look At Alumina Trihydrate", presented at The Global Outlook for Environmentally Friendly Flame Retardant Systems, Dec. 2–4, 1990, pp. 1–3 and 12 pgs. of attachments.

P.A. Mango, "Flame Retardant Systems For High Loft Nonwovens", Nonwovens Industry, Sep. 1997, pp. 80–90.

"Flame Retardants—101: Basic Dynamics—Past Efforts Create Future Opportunities", Fire Retardant Chemicals Association, Mar. 24–27, 1996, pp. 1–220.

"Pyrovatex—Fire protection for textiles", Ciba, 1990, 7 pgs.

C.J. Hilado, "Prevention, Inhibition, and Extinguishment", Flammability Handbook For Plastics, $4^{th}$ Edition, 1990, pp. 166–181.

T.A. Jay, "Polypropylene: Flame retardation with a good balance of properties", Plastics Compounding, Mar./Apr. 1986, pp. 30, 32–33.

B. Ceric et al., "Action of Various Flame Retardant Combinations on the Flammability of Polypropylene", Polymer Degradation and Stability 33, (1991), pp. 307–323.

M.T. Huggard, "New Intumescent Phosphorus–Based Fire Retardants", Plastics Engineering, Nov. 1993, vol. 49, No. 11, pp. 29–31.

D.W. Hairston, "Flame Retardants: Cool Under Fire", Chemical Engineering, Sep. 1995, Vo. 102, No. 9, pp. 65–68.

D.I. Bernd, "Recent Developments In The Field Of Flame Retardants For Polyolefins Based On Ammonium Polyphosphate", Flame Retardants Conference Proceedings, 1992, pp. 308–315.

Y.V. Gnedin, et al., "Investigation of Phosphorus–Containing Foam–Forming Systems as Combustion Retardants For Polypropylene", Polymer Science, 1991, vol. 33, No. 3, pp. 544–550.

"Exolit® IFR–23", Exolit® Flame Retardant, Hoechst Celanese Corporation, 1989, 2 pgs.

"®Hostaflam AP 750", Flame Retardant for Polyolefins, Hoechst Celanese Corporation, 1994, 5 pgs.

P.A. Annis, et al., "Xanthan An Effective Antimigrant For Dissolved Substances", American Dyestuff Reporter, Feb. 1996, pp. 39–43, 48.

"Application of X–12™ Flame Retardant", Spartan Flame Retardant, Inc., 10 pages, 1994.

FLAME INHIBITOR COMPOSITION AND METHOD OF APPLICATION

This is a division of application of Ser. No. 08/575,374, Dec. 20, 1995 and issued as U.S. Pat. No. 5,912,196 on Jun. 15, 1999.

FIELD OF THE INVENTION

The present invention is directed to flame retardants, and particularly flame retardants which include solubilized phosphorous.

DETAILED DESCRIPTION OF THE INVENTION

Definitions

Figure 1:
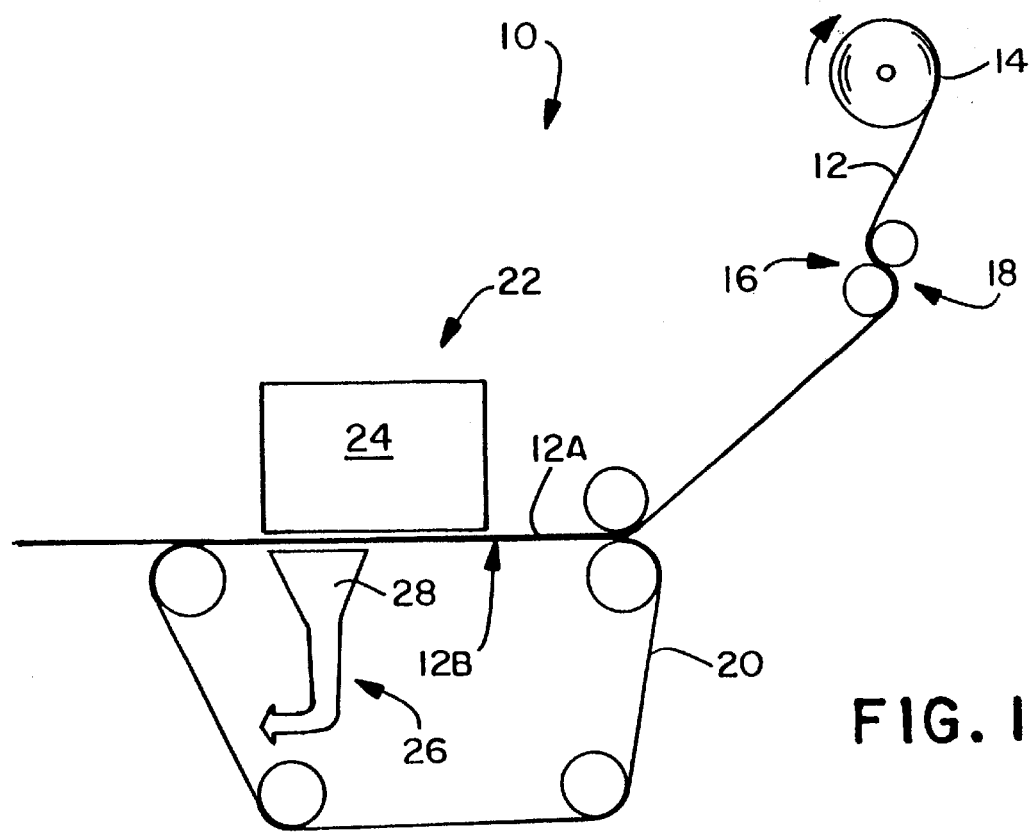
FIG. 1 is an illustration of an exemplary continuous process of non-compressively and uniformly applying a solution throughout a permeable sheet.
Figure 2:
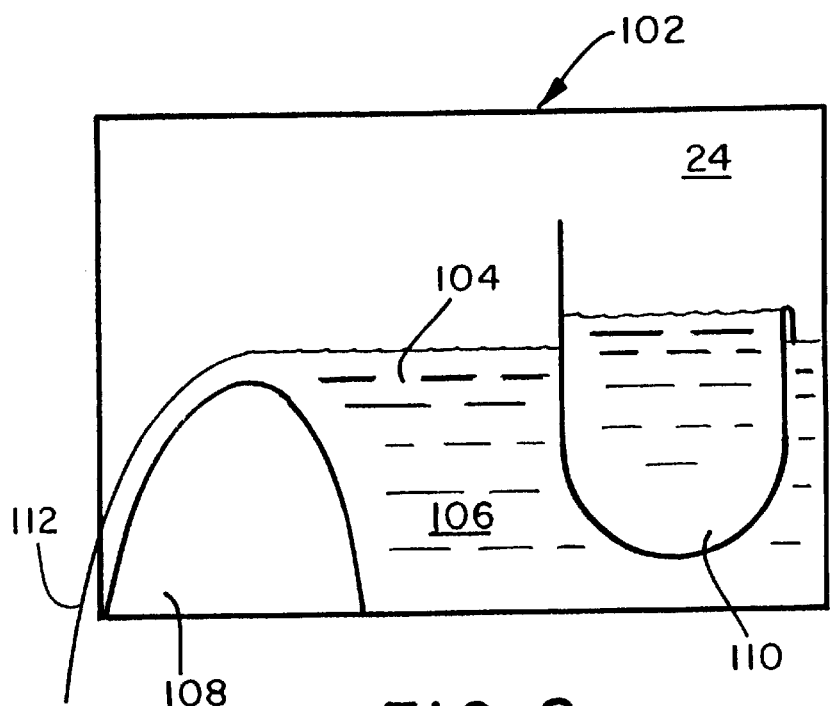
FIG. 2 is an illustration of an exemplary liquid distribution element.

As used herein, the term "nonwoven web" refers to a web that has a structure of individual fibers or filaments which are interlaid, but not in an identifiable repeating manner. Nonwoven webs have been, in the past, formed by a variety of processes known to those skilled in the art such as, for example, melt blowing, spunbonding, wet-forming and various bonded carded web processes.

As used herein, the term "spunbonded web" refers to a web of small diameter fibers and/or filaments which are formed by extruding a molten thermoplastic material as filaments from a plurality of fine, usually circular, capillaries in a spinnerette with the diameter of the extruded filaments then being rapidly reduced, for example, by non-eductive or eductive fluid-drawing or other well known spunbonding mechanisms. The production of spunbonded nonwoven webs is illustrated in patents such as Appel, et al., U.S. Pat. No. 4,340,563.

As used herein, the term "meltblown fibers" means fibers formed by extruding a molten thermoplastic material through a plurality of fine, usually circular, die capillaries as molten threads or filaments into a high-velocity gas (e.g. air) stream which attenuates the filaments of molten thermoplastic material to reduce their diameters, which may be to microfiber diameter. Thereafter, the meltblown fibers are carried by the high-velocity gas stream and are deposited on a collecting surface to form a web of randomly disbursed meltblown fibers. The meltblown process is well-known and is described in various patents and publications, including NRL Report 4364, "Manufacture of Super-Fine Organic Fibers" by V. A. Wendt, E. L. Boone, and C. D. Fluharty; NRL Report 5265, "An Improved Device for the Formation of Super-Fine Thermoplastic Fibers" by K. D. Lawrence, R. T. Lukas, and J. A. Young; and U.S. Pat. No. 3,849,241, issued Nov. 19, 1974, to Buntin, et al.

As used herein, the term "microfibers" means small diameter fibers having an average diameter not greater than about 100 microns, for example, having a diameter of from about 0.5 microns to about 50 microns, more specifically microfibers may also have an average diameter of from about 1 micron to about 20 microns. Microfibers having an average diameter of about 3 microns or less are commonly referred to as ultra-fine microfibers. A description of an exemplary process of making ultra-fine microfibers may be found in, for example, U.S. Pat. No. 5,213,881, entitled "A Nonwoven Web With Improved Barrier Properties".

As used herein, the term "fibrous cellulosic material" refers to a nonwoven web including cellulosic fibers (e.g., pulp) that has a structure of individual fibers which are interlaid, but not in an identifiable repeating manner. Such webs have been, in the past, formed by a variety of nonwoven manufacturing processes known to those skilled in the art such as, for example, air-forming, wet-forming and/or paper-making processes. Exemplary fibrous cellulosic materials include papers, tissues and the like. Such materials can be treated to impart desired properties utilizing processes such as, for example, calendering, creping, hydraulic needling, hydraulic entangling and the like. Generally speaking, the fibrous cellulosic material may be prepared from cellulose fibers from synthetic sources or sources such as woody and non-woody plants. Woody plants include, for example, deciduous and coniferous trees. Non-woody plants include, for example, cotton, flax, esparto grass, milkweed, straw, jute, hemp, and bagasse. The cellulose fibers may be modified by various treatments such as, for example, thermal, chemical and/or mechanical treatments. It is contemplated that reconstituted and/or synthetic cellulose fibers may be used and/or blended with other cellulose fibers of the fibrous cellulosic material. Fibrous cellulosic materials may also be composite materials containing cellulosic fibers and one or more non-cellulosic fibers and/or filaments. A description of a fibrous cellulosic composite material may be found in, for example, U.S. Pat. No. 5,284,703.

As used herein, the term "pulp" refers to cellulosic fibrous material from sources such as woody and non-woody plants. Woody plants include, for example, deciduous and coniferous trees. Non-woody plants include, for example, cotton, flax, esparto grass, milkweed, straw, jute, hemp, and bagasse. Pulp may be modified by various treatments such as, for example, thermal, chemical and/or mechanical treatments.

As used herein, the term "solution" refers to any relatively uniformly dispersed mixture of one or more substances (e.g., solute) in one or more other substances (e.g., solvent). Generally speaking, the solvent may be a liquid such as, for example, water and/or mixtures of liquids. The solvent may contain additives such as suspension agents, viscosity modifiers and the like. The solute may be any material adapted to uniformly disperse in the solvent at the appropriate level, (e.g., ionic level, molecular level, colloidal particle level or as a suspended solid). For example, a solution may be a uniformly dispersed mixture of ions, of molecules, of colloidal particles, or may even include mechanical suspensions.

As used herein, the terms "permeable" and "permeability" refer to the ability of a fluid, such as, for example, a gas to pass through a particular porous material. Permeability may be expressed in units of volume per unit time per unit area, for example, (cubic feet per minute) per square foot of material (e.g., $(ft^3/minute/ft^2)$. Permeability was determined utilizing a Frazier Air Permeability Tester available from the Frazier Precision Instrument Company and measured in accordance with Federal Test Method 5450, Standard No. 191A, except that the sample size was 8"×8" instead of 7"×7". Although permeability is generally expressed as the ability of air or other gas to pass through a permeable sheet, sufficient levels of gas permeability may correspond to levels of liquid permeability to enable the practice of the present invention. For example, a sufficient level of gas permeability may allow an adequate level of liquid to pass through a permeable sheet with or without assistance of a driving force such as, for example, an applied vacuum or applied gas pressure.

As used herein, the terms "laminar flow" and "laminar flowing" refer to a condition of fluid flow (e.g., liquid flow) in a conduit in which the fluid particles or streams tend to move parallel to the flow axis and not mix. Laminar flow is distinguished from turbulent flow which may be characterized as a diffused pattern of flow. For the purposes of the present invention, laminar flow is a generally calm, smooth, quiet flow and is not intended to be limited to the Reynolds number definitions of laminar flow.

As used herein, the term "bulk" refers to the thickness of samples measured with a Model 49–70 thickness tester available from TMI (Testing Machines Incorporated) of Amityville, N.Y. The thickness tester was equipped with a 2-inch diameter circular foot and measurements were taken at an applied pressure of about 0.2 pounds per square inch (psi). Bulk measurements of samples that are substantially dry (i.e., having a moisture content generally less than about 10 percent, by weight, as determined by conventional methods) may be referred to as dry bulk.

As used herein, the term "add-on" and "add-on rate" refers to an amount, by weight, of the soluble solids in a flame retardant composition which are applied to a permeable material, such as a high pulp content nonwoven web, such as for example a HYDROKNIT® web. Add-on and add-on rate may be expressed as a percentage of the combined weight of the permeable material and the weight of the applied soluble solids. The percentage of add-on and/or add-on rate may be determined by the formula: weight of the dry soluble solids applied/weight of the dry permeable material.

Generally, there are numerous factors which contribute to the flammability of fabrics. These factors include the nature of the fiber(s), construction of the fabric and added chemistries within the finished material. For example, differences in fabric weave can substantially effect fiber:air ratios and thus effect flame propagation; e.g., a piled fabric versus a tight twill of equal fiber and basis weight where the pile bursts into flame while the twill burns poorly.

There are at least three approaches in inorganic salt flame retarding systems to form a barrier between the combustible components, heat source and oxygen; i. e., 1) release hydration bound water to maintain a low fuel temperature, 2) decompose and form non-flammable gaseous products and 3) melt to isolate the fuel source from oxygen by decomposing to form a solid foam.

Inexpensive inorganic salt flame retardants may be used to treat disposable wood fiber containing fabrics. These salts are unreactive with the fabric and thus nondurable.

These salts may be grouped into three families or groups and work in the aforementioned approaches. These chemicals are grouped according to their pyrolytic mechanism of inhibiting flame propagation.

Group 1 consists of highly hydrated salts and/or mixtures which when heated melt and form a generally solid foam. The foam is generally stable to heat and serves as a barrier between the fabric and flame. Such foam also inhibits oxidation of carbon. Boron containing salts such as borax and boric acid are examples of this Group. They are generally most effective in preventing after flaming in textiles.

Group 2 consists of inorganic acids or acid salts which liberate acids on heating. Though not as effective in after flaming prevention in textiles as Group 1, they are effective in inhibiting afterglow. Afterglow is typically measured visually. By furnishing a free acid at the time of flaming, there is a redirection of the decomposition of cellulose to a primarily endothermic dehydration of the carbohydrate to water vapor and char. This results in significantly less pyrolytic tarry distillate production, lower oxidation temperatures and higher char formation. Ammonium phosphates, ammonium sulfate and antimony oxychloride are typical representatives of this group.

Group 3 consists of inorganics which decompose or sublime upon heating releasing large amounts of noncombustible gases which inhibit access to oxygen. In addition, such compounds enter various free radical processes within the flame, act as scavengers and influence the flame structure. Halides such as bromide/chloride salts typically form a part of this group.

Some salts overlap various Groups in their mode of flame inhibiting mechanism. Chemical formulations having active ingredients of chemicals from all three Groups generally give the best overall flame retardant characteristic with the least add-on rate and fabric damage to cellulosic substrates.

HYDROKNIT® web, is a high pulp content nonwoven web manufactured by Kimberly-Clark Corporation, which is formed from approximately 80% wood fiber cellulose and 20% polypropylene continuous fiber. (The terms "HYDROKNIT® web" and high pulp content web are used interchangeably herein.) The HYDROKNIT$^a$ web is highly flammable without a flame retardant treatment. To make HYDROKNIT$^a$ web flame retardant is a difficult task since it is similar to a "candle with a wick". Pyrolysis of cellulose and polypropylene differs and different flame inhibitors often are needed to address each. When a flame is applied to HYDROKNIT$^a$ web, wood fiber decomposes and liberates decomposition products which are highly combustible resulting in it bursting into flames. If heated enough in the presence of sufficient air, the fibers may burn and sustain their own exothermic reaction of combustion. Carbon char which then remains is subject to a flameless slow oxidation combustion which is independent of the flame reaction, noted by a glow, and releases additional heat which is even more intense than the flame. The magnitude of tar and char products are directly related to the flame proofing efficiency.

Because HYDROKNIT$^a$ web is primarily wood fiber, the cellulosic mechanism of combustion is the more dominant. The polypropylene component of the combustion is minor since it is less ignitable than cellulose and premelts tending to prevent flame spreading by falling away. However, the presence of polypropylene as a fuel source facilitates continuation of the exothermic reaction since it needs less oxygen than cellulose. It continues to burn slowly with sustained candle-like burning at elevated temperatures because of a higher Ignition Temperature (570° C. vs. 255°–400° C.) and lower Oxygen Index (0.186 vs. 0.201) than cellulose. The maximum flame temperature is about that of cellulose (839° C. vs. 860° C.).

One approach to flame retardant treating HYDROKNIT$^a$ web is to pretreat the polypropylene fiber melt with chemicals such as halogens, e.g. bromine compounds, followed by post treatment of the consolidated two fiber components by making the cellulose flame retardant by treatment with inorganic salts. Halogen treatments are expensive and there is an environmental effort to eliminate their use. Using only bromine chemistry to flame retardant treat HYDROKNIT$^a$ web is not effective. Refer to Table 1.

One aspect of this invention is a flame retardant composition which when applied to a high pulp content nonwoven web, prevents synergistic flaming from the combination of cellulose and polypropylene fibers.

Generally, when cellulose is subjected at temperatures above 300° C. as with a flame, the glycosyl backbone units of cellulose are depolymerized by a non-catalyzed route to tarry distillates of mainly levoglucosan and further decomposed to volatile alcohols, ketones, aldehydes and hydrocarbons. When these said glycosylic units are depleted, a stable char forms and is composed of predominately aliphatic and a smaller amount of aromatic components. With further heating the initially formed aliphatics are converted to aromatics that oxidize at approximately 520° C. Chars formed at lower aliphatic temperatures are more flammable, more pyrophoric and begin immediate oxidation upon formation at approximately 360° C. The aromatics are less reactive and thus chars formed at these higher temperatures are less combustible.

The exact definition of cellulose decomposition chemical reactions is not fully proven, however two distinct exothermic stages occur. The first at approximately 360° C. and corresponds to oxidation of the aliphatic components and the second distinct stage being at approximately 520° C. with the oxidation of the aromatic compounds. Within this pathway, release of inhibitors such as Lewis acids may interrupt oxidation. When catalyzed by such acids, cellulose decomposition proceeds primarily through a pyrolysis mechanism with the endothermic dehydration of cellulose and decomposition to char with water, carbon monoxide and carbon dioxide. Because of phosphoric acid's low volatility, it is a desirable flame retardant that lowers the pyrolysis temperature thus increasing the char amount formed by accelerating decomposition. Therefore, the acid-catalyzed dehydration phenomenon may be most effective when the free acid form is released near 360° C., generally the temperature at which the first stage of the exothermic oxidation reaction occurs.

Numerous commercially available flame retardants have been tested on HYDROKNIT$^a$ webs. (see Table 1) These flame retardants include a wide range of inorganic salts, brominated compounds, and organophosphates. When such flame retardant compounds are applied to HYDROKNIT$^a$ webs negative attributes may arise such as high add-on rates (generally above 15%) and/or loss of hand, drape, corrosivity, skin irritation and shorten shelf life. For example, in the case of antimony, the required add-on rate is 20% (by wt.) and tactile properties of the web are negatively effected. Phosphorous add-on rates are generally higher than the add-on rate of antimony. Using conventional inorganic ammonia orthophosphate salts, e.g. monoammonia (MAP) which contains 26.8% phosphorous or diammonium phosphate (DAP) with 23.5% phosphorous, add-on rates of 30% are typically employed. The hydroscopic and fugitive nature of inorganic salts may result in loss of hand, drape, corrosivity, skin irritation and shelf life problems.

As illustrated in Table 1, phosphorous containing flame retardants were analyzed. Another aspect which is desirable for flame retardants for use in high pulp nonwoven webs, such as HYDROKNIT$^a$ web, is the temperature at which the free phosphoric acid catalyst becomes available in the cellulose pyrolysis reaction pathway. If available at a low temperature (generally below 170° C.) and early in the pyrolysis reaction, it is less effective in carbon char formation. For example, though mono and diammonium phosphates (MAP and DAP) and ammonium polyphosphate (APP) are quite similar, ammonium polyphosphate is more temperature stable and may not release the reactive catalytic acid until cellulose decomposition has proceeded along far enough to produce a rather large amount of flammable tars which than can be catalyzed. With APP, other advantages are gained. This includes lower ammonia emission during the web drying step since APP has higher heat stability and a smaller, uncomplexed ammonia:phosphate ratio than MAP or DAP and there is no after glow.

Of the phosphorous containing ammonium phosphate compounds, ammonium polyphosphates are the most effective as a flame retardant in treating high pulp content nonwoven webs. Ammonium polyphosphates are typically produced by heating ammonium phosphate in the presence of urea or an ammonia atmosphere to form large polymeric complexes rich in phosphorous. As shown in Table 2, relative phosphorous content values of ammonia phosphate types are presented. These APP polymeric crystals become large enough in size to become almost totally insoluble in water. The higher the molecular weight, the higher the insolubility and the more heat stable APP becomes. For treating HYDROKNIT$^a$ web, APP which decomposes closest to the first exothermic stage of 360° C. are more effective than APP which decomposes at lower temperatures, generally below 170° C. Of course APP which begins decomposition at temperatures greater than 360° C., would not generally be as effective in flame inhibition. Thermogravimetric analysis (TGA) of APP directly correlates to HYDROKNIT$^a$ web flame retardancy as measured by char lengths. As shown in Table 2, a variety of commercially available APP compounds have been solubilized and used to treat HYDROKNIT$^a$ web. The closer the decomposition temperature of APP is to 360° C., the more effective the APP flame retardant treatment of HYDROKNIT$^a$ web becomes via conventional padding application methods. Also shown in Table 2, as the thermal stability of the APP increases, its solubility in water decreases. To produce an optimal flame retardant formula (AFI composition described below), the APP properties related to flame inhibition, water solubility, thermal stability, and cost are balanced.

In some instances, high pulp content nonwoven webs, such as HYDROKNIT$^a$ web, may be formed by a wet process. In these instances, to treat such webs with an APP-based flame retardant at high speed line speeds (generally, line speeds in excess of 200 ft/min) using the padding non-compressive applicator as the described below, a soluble solids content of neat solution is desirably at least 20%. As shown in Table 2, desirably, APP with the higher TGA values is limited to solubilities of 10% or less. As shown in Table 3, Monsanto Phos-Chek$^a$ P-30 APP by itself is desirably added at about 23% solids loading to HYDROKNIT$^a$ web to produce 4.0" char lengths. Albright & Wilson Amgard$^a$ MC and CL APPs at similar loadings produce slightly longer char lengths which is reflected in a lower temperature of decomposition.

Upon combining various commercially available APP flame retardant compositions, it was observed that no antagonistic behavior resulted from such combination. Refer to Table 3. With P-30 being only soluble to a 10% level and a 20% neat solution being desired for manufacturing as well as less volume handling, additional APP addition is warranted. This is obtained by adding the less desirable MC APP to increase soluble solid loading since it is more soluble than higher molecular weight APP. Amgarde$^a$ CL was not used because of the high ammonia emissions during web drying.

It was further observed that the use of APP-based flame retardants, when treating HYDROKNIT$^a$ web leads to problems with browning and fabric stability at elevated temperatures such as in the web drying process and upon long-term storage. Urea and its derivative guanidine salts, melamine and hydrotalcite have all been shown to be have buffering capacity to stabilize browning and are synergistic to flame inhibition. See Table 3. There are trade-offs with using such buffer chemistry since often they are fugitive, upon burning emit toxic gases, have carcinogenic activity and/or are not readily water soluble.

In an effort to avoid fabric browning, stability and storage problems, a flame retardant composition, referred to as AFI or "Adsorbent Flame Inhibitor", was developed. Generally, the AFI is an APP-based flame retardant composition, wherein the soluble solids content ranges from about 4 to 58 weight percent, and more desirably, from about 10 to 40 weight percent, and still more desirably, from about 20 to 35 weight percent, and most desirably, from about 28 to 32 weight percent. Desirably, the TGA for such soluble solids ranges form about 175° C. to about 370° C., and desirably from about 200° C. to about 370° C., and desirably from about 250° C. to about 370° C. and desirably from about 270° C. to about 365° C. The soluble solid phosphate content of such soluble solids desirably ranges from about 6:1 to about 1:1 when compared to the soluble solids content. Furthermore, the soluble solid APP content of the soluble solid phosphate content desirable ranges from about 8:1 to about 2:1.

The adsorbent property of AFI may be measurable. Typically with MAP and DAP solutions, treating HYDROKNIT$^a$ web with a 15% neat solution via laboratory saturant padding produces an add-on rate of around 20%. Under generally identical conditions, a 7% APP P-30 solution produces an add-on rate of 15–17% indicating a highly adsorptive nature. The HYDROKNIT$^a$ web consistency prior to treatment was 30%. With this, a uniform fiber coating is thought to occur and thus flaming variability decreases. Such an adsorbent property could also be an advantage in treating a wide range of cellulosic containing materials other than HYDROKNIT$^a$ web.

One aspect of the AFI composition is the utilization of the complimentary chemistries of various commercially available APP-based flame retardants. Such complimentary chemistries may include TGA ranges and flame inhibition effectiveness of the soluble solids therein. By doing such, expensive APP content is reduced. In addition, total solids of the neat solution can be increased to greater than 20%. Another aspect of the AFI composition is to avoid strong mono and divalent cations which denature APP. Such ions are Na+, K+, Ca++ and others. With this, boric acid and ammonium sulfate salts generally add buffering capacity and are complementary in flame inhibition. Halogens can also be included and are synergistic with phosphorous. In addition, use of ammonium lauryl sulfate for wetting, softening, and dermatological attributes along with corrosion inhibitors, e.g. derivatives of polyphosphoric acid partial esters, can further add beneficial attributes, if desired.

While there are numerous flame retardant phosphate formulas available commercially, no individual commercially available phosphate flame retardant was found acceptable for treatment of HYDROKNIT$^a$ web. See to Table 1. In one embodiment, an AFI composition was formulated by combining a commercially available predominantly anhydrous ammonia salt formula, called Spartan$^a$ X-12 NF (manufactured by Spartan Flame Retardants, Inc., Crystal Lake, Ill.) with other commercially available flame retardant compositions. X-12 was chosen because of its stability at elevated temperatures, additives to enhance fabric hand attributes, and afterglow. Spartan$^a$ X-12 contains about 1:4 ratio of elemental phosphorous:sulphur as measured by Energy Dispersive X-Ray analysis.

As shown in Table 4, by itself X-12 is a poor flame retardant for treatment of HYDROKNIT$^a$ web and add-ons of 30%+ are required with high variability in char lengths. With APP (P-30, MC, and combinations thereof provide suitable quantities of APP) and X-12, there is a synergistic effect requiring less addition of the more costly APP. Both P-30 and MC react similarly with X-12. An example ratio of APP:X-12 is a ratio of about 50:50 APP:X-12. Table 4 illustrates various ratios of commercially available APP-based flame retardants, such as P-30 and MC, with Spartan$^o$ X-12. To optimize the AFI for commercial use, ratios of 25:25:50 and 30:20:50 (P-30:MC:X-12) by solids weight are desirable. At such ratios, an approximately 30% soluble solids neat solution of a desirable flame retardant is made. At such concentrations, the complexed phosphorous content results in TGA values of about 250° C.–370° C. and the HYDROKNIT$^a$ web, at a 22% add-on rate, has about a 4.3" char length average with a standard deviation of about 0.4" per NFPA 701 Vertical Flame Test. (Desirably, the NFPA 701 Vertical Flame Test results for materials treated with the flame retardant composition of the present invention should not exceed an average char length of 5.5 inches.) Elemental analysis of the soluble solids of the 30% soluble solids neat solution indicated a phosphorous:sulphur ratio of about 9:1 when measured by Energy Dispersive X-Ray analysis. Generally, the higher the percentage of soluble solids in the neat flame retardant solution, the easier it is to ship the flame retardant solution. Once at its destination, the neat flame retardant solution may be diluted to specification.

It has been observed that the AFI composition is stable at temperatures down to 60 F. Below 60° F., salts may precipitate. Higher solids content can be made by adding boric acid. With the AFI composition, ammonia emissions are dramatically reduced, browning eliminated, corrosion is minor and the AFI composition is dermatologically acceptable. The procedure for preparing AFI is as follows:

AFI Formulation

1) Bring water to a sustained rolling boil. The water should be under agitation with a mixer.

2) Add * APP and sustain the rolling boil. Periodically check temperature to insure it is maintained at 212 F. If both P-30 and MC are to be added, the P-30 should be added first. To add, the powdered APP should be added at a rate to insure the solids quickly go into suspension rather than remain in clumps or cake form. Ideally a shaker feed might be utilized. Do not add the APP prior to boiling for there is a chance of readily damaging the lower molecular weight APP with extended heating. Boil for a sufficient time period to have optimum solubilization. If over boiled, the APP may denature, molecular weight and TGA values may decrease and flame retardant properties may lessen.

3) Determine % APP solids in solution. This is done to determine how much Spartan$^o$ X-12 NF to add to the AFI to adjust to the target addition ratio. 30% AFI (three component) is approximately 7.5% P-30, 7.5% MC and 15% X-12 for a 25:25:50 ratio. The ratio is the target weight of addition for it directly effects product performance. To determine % APP solids in solution, after boil take an aliquot, centrifuge for 5 mins. at approximately 1000 g at room temperature. Decant and measure solids loading of the supernate by weighing the solids after bone-dried. The pH of the supernate is desirable between 4 and 5.5.

4) Lower the APP solution to 140 F. with continuous agitation. Cool to remove the chance of molecular weight degradation.

5) Add the Drecalculated X-12 (based on #3 results) to the agitating solution and sustain the 140 F. temperature for 30 mins to fully solubilize the X-12.

6) Adjust the final solution concentration to approximately 30% by adding hot water (120+ F.). Note: If cold water is used to dilute, precipitation can occur. If the solid concentration is above the target specification of 30%, the solution may not be stable at ambient temperature and precipitation may occur.

7) Afterwards, cool fairly quickly to at least 100 F. to avoid ammonia emission and degradation. pH of the cooled supernate may range from about 6 to about 7. * APP= Monsanto Phos-Chek$^a$ P-30 (fine grade) and/or Albright & Wilson Amgard$^a$ MC There are many ways to apply the AFI composition to a permeable sheet, such as a high pulp content nonwoven composite fabric. For example, the AFI composition may be applied to permeable sheets by a size press or dip/dunk and press or vacuum extraction processes. Such processes may be unsatisfactory for some applications because the compressive forces involved may diminish sheet bulk and desirable properties associated with bulk. In addition, it may be difficult to achieve a uniform distribution of the AFI composition throughout the permeable sheet (e.g., throughout the interior of the permeable sheet).

Processes such as printing or spraying may also be used to apply the AFI composition. Printing processes and spraying are generally applicable to a single surface of a sheet. Such processes may be unsatisfactory because they may create additional complexity if it is desired to apply the AFI composition to both sides of a sheet. Also, such processes may have difficulty achieving uniform distribution and high add-ons of the AFI composition throughout the permeable sheet.

The permeable sheets may be made by dry-forming processes or by wet-forming processes. In those instances where the permeable sheets are made by wet-forming processes, the AFI composition may be applied to such sheets by adding the solution to the wet-forming process. Such a process may make relatively inefficient use of the AFI composition, especially if the process diluent, such as for example water, is not properly recycled.

Desirably, the AFI composition may be applied uniformly to wet-formed permeable sheets by a continuous, non-compressive process. Referring now to FIG. 1, there is shown at 10 an exemplary continuous process of non-compressively and uniformly applying the AFI composition throughout a permeable sheet. A permeable sheet 12 is unwound from a supply roll 14 and travels in the direction indicated by the arrow associated therewith as the supply roll 14 rotates in the direction of the arrows associated therewith. The permeable sheet 12 may be formed by one or more sheet making processes and passed directly into the process 10 without first being stored on a supply roll 14. Exemplary sheet-making processes include processes such as melt blowing processes, spunbonding processes, bonded-carded web-making processes, wet-laying and dry forming processes and the like.

The permeable sheet may be passed through a pre-treatment station to modify the sheet. For example, the sheet may be calendered with a flat roll, point bonded or pattern bonded in order to achieve desired physical and/or textural characteristics. Additionally, at least a portion of a surface of the sheet may be modified by various known surface modification techniques prior to entering the continuous process of non-compressively and uniformly applying the AFI composition throughout said sheet 12. Exemplary surface modification techniques include, for example, chemical etching, chemical oxidation, ion bombardment, plasma treatments, flame treatments, heat treatments, and/or corona discharge treatments.

The permeable sheet may be a nonwoven fibrous web such as, for example, a bonded carded web, spunbonded web, web of meltblown fiber, a multi-ply fibrous web containing the same type of fibrous web, a multi-ply fibrous web containing different types of fibrous webs or a high pulp content nonwoven composite web. If the permeable sheet is a web of meltblown fibers, it may include meltblown microfibers. These nonwoven webs may be formed from thermoplastic polymers or thermoset polymers. If the nonwoven web is formed from a polyolefin, the polyolefin may be polyethylene, polypropylene, polybutylene, ethylene copolymers, propylene copolymers and butene copolymers. The fibers and/or filaments may be formed from blends that contain various pigments, additives, strengthening agents, flow modifiers and the like. Such fabrics are described in U.S. Pat. Nos. 4,041,203, 4,374,888, and 4,753,843, the contents of which are incorporated herein by reference. Those patents are assigned to the Kimberly-Clark Corporation, the assignee of the present invention.

The permeable sheet may be a nonwoven web that may also be a composite material made of a mixture of two or more different fibers or a mixture of fibers and particulates. Such mixtures may be formed by adding fibers and/or particulates to the gas stream in which meltblown fibers are carried so that an intimate entangled commingling of meltblown fibers and other materials, e.g., wood pulp, staple fibers and particulates such as, for example, activated carbon, silica, and hydrocolloid (hydrogel) particulates commonly referred to as superabsorbant materials, occurs prior to collection of the meltblown fibers upon a collecting device to form a coherent web of randomly dispersed meltblown fibers and other materials such as disclosed in U.S. Pat. No. 4,100,324 which is hereby incorporated in its entirety by reference.

In those instances when the permeable sheet is formed from high pulp content nonwoven composite web, such high pulp content nonwoven composite web desirably contains more than about 70 percent, by weight, pulp fibers which are hydraulically entangled into a continuous filament substrate. Such a high pulp content nonwoven composite web and method of making the same is disclosed in U.S. Pat. No. 5,284,703 which is hereby incorporated in its entirety by reference.

If the permeable sheet is a nonwoven web, the fibrous material in the nonwoven web may be joined by interfiber bonding to form a coherent web structure. Interfiber bonding may be produced by entanglement between individual meltblown fibers, carded fibers, spunbond filaments and/or other fibrous materials. Some fiber entangling is inherent in the meltblown process, bonding-carding process and/or spunbond process but may be generated or increased by processes such as, for example, hydraulic entangling or needle punching. Alternatively and/or additionally a bonding agent may be used to increase the desired bonding. If at least a portion of the fibrous material in the permeable sheet is cellulosic fibrous material, some interfiber bonding may be attributable to "paper" bonding.

The permeable sheet (prior to processing) may have a basis weight ranging from about 15 gsm to about 200 gsm. For example, the permeable sheet may have a basis weight ranging from about 20 gsm to about 120 gsm. Desirably, the permeable sheet may have a basis weight ranging from about 20 gsm to about 110 gsm.

The permeable sheet 12 passes through the nip 16 of an S-roll arrangement 18 in a reverse-S path. From the S-roll arrangement 18, the permeable sheet 12 passes to a means for continuously advancing 20 the permeable sheet throughout the flame inhibitor treatment process. Generally speaking, the means for continuously advancing 20 the permeable sheet may be, for example, a moving foraminous belt, a permeable fabric, netting, webbing or the like. It is contemplated that the permeable sheet 12 may be self-supporting and need not be transported on a moving belt.

The permeable sheet 12 then passes under a means for depositing a substantially laminar flowing curtain of AFI composition 22 substantially across and onto a first surface 12A of the continuously advancing permeable sheet. According, to the invention, the means for depositing a substantially laminar flowing curtain 22 may be composed of at least one liquid distribution element 24. For example, multiple liquid distribution elements 24 may be arranged in series. The liquid distribution element 24 may be a spillway adapted to produce a substantially laminar flow of liquid. Desirably, the liquid distribution element 24 may be composed of a turbulence reducing reservoir and a spillway adapted to produce a substantially laminar flow of liquid.

Referring now to FIG. 2 of the drawings, there is shown at 100 an exemplary liquid distribution element 24 (not necessarily to scale). The liquid distribution element 24 is essentially a large container 102 with an inlet (not shown) which supplies liquid 104, such as for example the AFI composition described herein, a reservoir 106, a spillway or weir 108, and baffle 110. Generally speaking, the inlet should be designed to reduce liquid turbulence in the reservoir 106. Conventional turbulence reducing techniques and/or devices may be used. Exemplary techniques include, for example, adding vanes or fins, modifying flow rates and/or modifying the dimensions of the reservoir and/or inlet. Liquid 104 enters the liquid distribution element 24 at an inlet (not shown) and passes through the baffle 110 into the reservoir 106. The baffle 110 is intended to reduce turbulence in the reservoir 106. Liquid 104 then travels over a spillway 108 which may have a smoothly curved and continuously even surface in a substantially laminar flow such that a generally laminar flowing curtain of liquid 112 is formed. Desirably, the lowest lip of the spillway 108 may be a very short distance above the permeable sheet. For example, the lowest lip of the spillway may be less than one inch above the permeable sheet to minimize the distance the laminar flowing curtain of liquid 112 must free-fall. The spillway may have other conventional designs. For example, the spillway may be straight, fluted, patterned or the like.

Although the inventors should not be held to a particular theory of operation, it is generally thought the laminar flow of the AFI composition onto the permeable sheet enhances uniform application of the AFI composition.

The means for depositing a continuous, substantially laminar flowing curtain 112 should be adapted to handle flow rates of at least about 0.15 gallons per minute per inch of curtain width. For example, the means for depositing a continuous, substantially laminar flowing curtain 112 should be adapted to handle flow rates of at least about 0.2 to over about 0.75 gallons per minute per inch of curtain width. The curtain width may be any width suitable to extend across the width of the material to be liquid treated. Widths in excess of nine feet are contemplated. At such widths, flow rates into the liquid distribution element 24 may exceed 75 gallons per minute. Generally speaking, the continuous, substantially laminar flowing curtain of liquid 112 may have the form of a relatively thin film of liquid as it flows onto and across the permeable sheet. The thickness of the curtain 112 may be dependent upon such factors as, for example, viscosity, flow rate and design of the liquid distribution means. Thickness of the curtain 112 may range from about one to about ten millimeters, although other thicknesses could be used.

The flow rate and substantially laminar flow of the curtain of liquid 112 are generally intended to avoid disturbing the structure of the permeable sheet. This stands in contrast to processes such as, for example, hydraulic entangling which specifically intends liquid flows that disturb, entangle and/or intertwine components (e.g., fibers) in the structure of a web or sheet.

Referring again to FIG. 1, means for applying a vacuum 26 to the second surface of the continuously advancing permeable sheet are located near the liquid deposition element 24. Desirably, the vacuum is applied substantially simultaneous with the deposition of the AFI composition. Generally speaking, the vacuum means 26 may be composed of at least one vacuum element 28. Multiple vacuum elements 28 may be arranged in series to adjust web consistency. The vacuum element 28 may be a conventional vacuum channel or groove such as, for example, a vacuum slot. The vacuum means 26 should be adapted to handle flow rates of the AFI composition corresponding to the flow rates out of the liquid deposition means 22.

Upon application of the vacuum to the second surface 12B of the permeable sheet, a substantial portion of the AFI composition is drawn from the first surface 12A and substantially through the permeable sheet. This passage of the AFI composition through the permeable sheet is generally thought to generate a substantially uniform distribution of AFI composition throughout the permeable sheet. Generally speaking, evacuation of the AFI composition to achieve a desirable substantially uniform distribution of such solution may be accomplished with a sheet having a permeability of at least about 20 cfm/ft$^2$, as measured for a substantially dry sheet prior to being processed. For example, the permeability of the sheet range from about 50 to over 200 cfm/ft$^2$, as measured for a substantially dry sheet prior to being processed. If a sheet has inadequate permeability, the AFI composition may puddle or pool on the first surface and may be non-uniformly concentrated, absorbed or diffused through the sheet.

The permeable sheet 12 may then be passed to a drying operation (not shown). Exemplary drying operations include processes which incorporate infra-red radiation, yankee dryers, steam cans, microwaves, hot-air and/or through-air drying techniques, and ultrasonic energy.

Desirably, the flame inhibitor should be able to flow freely. For example, the AFI composition may have a viscosity of from about 0.4 to about 20 centipoise. While low viscosity liquids are prone to turbulent flow, AFI composition viscosities in the region of about 1.0 centipoise are generally considered desirable. However, it is contemplated that more viscous flame inhibitors could be used. Although the inventors should not be held to a particular theory of operation, it is thought that the ability of the AFI composition to flow freely (and in relatively large volumes) through the sheet with the assistance of an applied vacuum enhances the substantially uniform distribution of the AFI composition throughout the sheet.

Generally speaking, the above application process can be thought of as a thin film displacement wash process. The "free" water (replacable void volume water) contained in the permeable sheet 12, such as for example a HYDROKNIT[a] web, which is formed by a wet process, such as a Fourdrinier paper machine, is replaced with a solution flowing over the spillway 108 (FIG. 2) where the spillway solution concentration is adjusted to allow for the correct solids add-on percentage once the water in the solution is evaporated.

Specifically, approximately 70–80 percent of the water in the permeable sheet 12 approaching the spillway 108 is "free" water. That is, it is water that can be easily replaced by new fluid. The new fluid is the AFI composition is contained in the fluid distribution element 24. The solids concentration of the spillway solution is adjusted to match the desired add-on rate of chemical. For example; the sheet 12 coming to the spillway 108 contains 100 pounds of dry fiber and 233 pounds of water or a typical 30% consistency sheet. ("consistency" is calculated by dividing the dry weight of the sheet by the total weight of the sheet (dry weight+weight of the water)) Out of the 233 pounds of water, approximately 175 pounds or 75% is "free" water. If the desired add-on rate is 10% dry solids then the 175 pounds of "free" water can be replaced with 175 pounds of solution water and 10 pounds of dry chemical (10% of 100 pounds dry fiber) to keep the drying load equal to what it was previously. Given these numbers, the solution concentration would need to be 10 pounds of dry chemical in "175 pounds of water plus 10 pounds of chemical" for a desired solution concentration of 5.4%.

The above discussion assumes that the drying load and so the speed of the machine is to be kept at the baseline conditions if at all possible. If this assumption is not valid then the solution solids percentage can be varied up or down as long as it is balanced by the solution add-on rate. The result of which will be the dry solids add-on rate.

A further aspect of process balance described above is the required balancing of the neat solution water content. Taking the above description where solution concentration was determined to be 5.4%, lets assume that the neat chemical that needs to be incorporated into the sheet is formulated at a maximum of 30% solids (the above paragraph assumes the neat chemical is 100% active or that it is a powder.) To arrive at the 10 pounds of dry chemical add-on rate the neat chemical add-on rate is desirably 10/30% or 33 pounds of neat chemical solution. This now incorporates an additional 23 pounds of water that either is left in the sheet causing a net machine speed loss corresponding the increased drying load. Or alternately, the incoming consistency can be raised by the removal of 23 pounds of water (100 dry pounds/{233 pounds of water minus 23 pounds}) giving an incoming consistency of 32.2% by the incorporation of higher dewatering vacuum levels, pressing, or the addition of a dewatering steam or hot water shower. This is a desired method of operation since it does not sacrifice machine productivity.

Desirably, a substantial portion of the AFI composition may be drawn through the sheet 12 in less than about 1 second to generate a substantially uniform distribution of the AFI composition throughout the permeable sheet. For example, a substantial portion of the AFI composition may be drawn through the permeable sheet in less than about 0.1 second. As a further example, a substantial portion of the AFI composition may be drawn through the permeable sheet in less than about 0.01 second. As yet another example, a substantial portion of the AFI composition may be drawn through the permeable sheet in less than about 0.001 second. The expression "a substantial portion of the AFI composition may be drawn through the sheet" generally refers to evacuating or drawing off the AFI composition at the second surface of the permeable sheet at a rate which is at least about 75 percent of the rate at which the liquid is deposited on the first surface of the sheet. For example, the AFI composition may be evacuated or drawn off at the second surface of the permeable sheet at a rate which is at least about 40 percent of the rate at which the AFI composition is deposited on the first surface of the sheet. As a further example, AFI composition may be evacuated or drawn off at the second surface of the permeable sheet at a rate which is at least about 10 percent of the rate at which the AFI composition is deposited on the first surface of the sheet. If AFI composition is deposited on the first surface of the sheet at a rate of about 0.3 gallons per minute per inch of curtain width for a 100 inch curtain (i.e, about 30 gallons per minute), the AFI composition may be evacuated from the second surface at a rate at least about 15 gallons per minute. Other liquid already present in the permeable sheet (e.g., liquid in a partially hydrated sheet) may constitute some of the total volume of liquid evacuated or drawn off at the second surface of the permeable sheet.

The deposition of the AFI composition may be accomplished with a short dwell time or residence time (e.g., less than 1 second) of a substantial portion of the AFI composition on the permeable sheet. Short dwell times or residence time of the AFI composition on the permeable sheet may provide advantages, such as avoiding harm or degradation of the permeable sheet, over conventional saturation processes having relatively long dwell times.

Although the inventors should not be held to a particular theory of operation, several factors are believed to contribute to the uniform distribution of the AFI composition throughout the permeable sheet. Among these are: uniform deposition of the AFI composition onto the permeable sheet, permeability and consistency of the permeable sheet, uniformity of the permeable sheet, viscosity of the AFI composition, application of vacuum to draw a portion of the AFI composition through the sheet, and volume of the AFI composition drawn through the permeable sheet.

Substantially uniform application of the AFI composition throughout a permeable sheet can be measured in several ways. One convenient measurement relates to the application of a colorant such as, for example, a dye solution. Substantially uniform application of a dye in the AFI composition throughout a permeable sheet that is receptive to the dye generally achieves a relatively similar color intensity throughout the sheet and avoids streaks, bands, lines or other defects. Color intensity at specific locations throughout the sheet may be determined by conventional color intensity measurement techniques. Exemplary color intensity measurement equipment include Hunter Colormeter and Bausch & Lomb Spectronic 20 Colorimeter.

TABLE 1

Treatment of HYDROKNIT ® Web with various types of flame retardants

| Flame Retardant | % Add on | Char Length (inches) | Issues |
|---|---|---|---|
| Borax/Boric Acid 7:3 | 22 | >6.5 NFPA 701 failure | Inadequate flame retardancy |
| FR-48 (Spartan Flame Retardants, Inc) Borax/Boric Acid/DAP | 25 | >6.5 NFPA 701 failure | Inadequate flame retardancy Ammonia odor emissions |
| Polybor (U.S. Borax Inc.) (Borax/Boric Acid) | 25 | 5.4 | Poor hand/boardy |
| Hipofire-GCF (High Point Chemical Corp) (antimony trioxide) | 24 | 6.3 | Ammonia odor emissions Material degradation/ discoloration Sourcing |
| 938 FR (Spartan Flame Retardants, Inc) | 21 | 6.0 | Ammonia odor emissions Material degradation/ discoloration |

TABLE 1-continued

Treatment of HYDROKNIT ® Web with various types of flame retardants

| Flame Retardant | % Add on | Char Length (inches) | Issues |
|---|---|---|---|
| Ultragard 929 (MFG Chemical, Inc) (MAP) | 25 | 5.0 | Ammonia odor emissions |
| 880 FR (Spartan Flame Retardants, Inc) (MAP) | 28 | 5.0 | Material degradation/ discoloration |
| FR-0241 (Evode-Tanner Industries, Inc) (organophosphate) | 25 | >6.5 NFPA 701 failure | |
| FR-756 (Great Lakes Corporation) (bromine compound) | 18 | >6.5 NFPA 701 failure | Acrid odor emissions |

TABLE 2

Various Attributes of APP-based Flame Retardants - Treated HYDROKNIT ™ Web

| Chemical | P Content dry solid | Max. Water Solubility | TGA$^1$, Start | C Rapid | % Solids Add-on | Char Length* Ave. |
|---|---|---|---|---|---|---|
| DAP | 23.5% | 58% | 87 | | 21 | 4.8" |
| MAP | 26.8% | 40% | 147 | | 25 | 5.0" |
| Albright & Wilson Amgard ® CL** | — | 45% | 176 | 210 | 22 | 4.4" |
| Albright & Wilson Amgard ® MC | 30.5% | 20% | 250 | 300 | 22 | 4.5" |
| Monsanto Phos-Chek ® P-30 | 32% | 10% | 281 | 369 | 23 | 4.0" |
| AFI | >15% | 28–30% | 250 | 370*** | 22 | 4.3" |

*NFPA 701 Vertical Flame Test.
**Strong ammonia emission
***TGA values are estimates based on the Chemical (for example P-30, MC, etc) combination and not based on lab analysis.
TGA$^1$ - TGA values derived from literature and not based on lab analysis.

TABLE 3

Treatment of HYDROKNIT ® Web with APP-Based Flame Retardants - NFPA 701 Vertical Flame Tested

| Chemical | % Solids Add-on | Char Lengths Ave. | S. Dev. | Comments* |
|---|---|---|---|---|
| Phos-Chek ® P-30 | 14 | 6.0" | 0.5 | Browning |
| | 23 | 4.0" | 0.4 | Browning |
| Amgard ® MC | 22 | 4.5" | 0.5 | Browning |
| P-30:MC (50:50)** | 21 | 4.0" | 0.7 | Browning |
| P-30:Urea (5:1)** | 15 | 4.3" | 0.7 | No Browning |
| P-30:Melamine (5:1)** | 21 | 3.9" | 0.6 | No Browning |
| P-30:Hydrotalcite** (5:1)** | 19 | 4.4" | 0.8 | No Browning |

*All samples were artificially heat-aged (at about 94° C.) in an oven for 3–5 hours.
**By weight.
***HySafe ® 310, J. M. Huber Corporation.

TABLE 4

Flame Retardant Treated HYDROKNIT ® Web using Spartan ™ X-12 NF and Combined with Various Amounts of Monsanto Phos-Chek ® and Albright & Wilson Amgard ® MC

| Chemical | % Solids Ad-on | Char Length* Ave. | S. Dev. | Comments |
|---|---|---|---|---|
| Spartan ™ X-12 | 30 | 5.3" | 1.0 | No Browning |
| P-30:X-12 (79:21)** | 22 | 4.2" | 1.3 | No Browning |
| P-30:X-12 (55:45)** | 25 | 3.4" | 0.2 | No Browning |
| P-30:X-12 (50:50)** | 22 | 4.4" | 0.4 | No Browning |
| MC:X-12 (60:40)** | 20 | 5.2" | 0.8 | No Browning |
| MC:X-12 (50:50)** | 19 | 5.3" | 1.8 | No Browning |
| P-30:MC:X-12 (25:25:50)** | 22 | 4.3" | 0.4 | No Browning |
| P-30:MC:X-12 (30:20:50)** | 23 | 4.4 | 0.4 | No Browning |

*NFPA 701 Vertical Flame Tested.
**By weight.

While the present invention has been described in connection with certain embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed is:

1. A flame retardant high pulp content nonwoven composite web comprising:
   fibrous cellulosic materials;
   a continuous filament substrate; and
   flame retardant water soluble solids further comprising at least one inorganic salt having an element selected from the group consisting of bromine, boron, nitrogen, sulfur, phosphorous, chlorine, and antimony wherein the percent solid add-on ranges from between about 15 to about 35, and the average char length, determined by NFPA 701 Vertical Flame Test, does not exceed about 5.5 inches.

2. The flame retardant high pulp content nonwoven composite web of claim 1 wherein the percent solids add-on ranges from between about 15 to about 25 and the average char length, determined by NFPA 701 Vertical Flame Test, does not exceed about 5.2 inches.

3. The flame retardant high pulp content nonwoven composite web of claim 1 wherein the water soluble solids are formed from a combination of phosphorus and sulfur.

4. The flame retardant high pulp content nonwoven composite web of claim 1 wherein the TGA range for the water soluble solids is between about 175° C. to about 370° C.

5. A flame retardant composite sheet comprising:
   a permeable sheet;
   a fibrous cellulosic material; and
   flame retardant water soluble solids further comprising at least one inorganic salt having an element selected from the group consisting of bromine, boron, nitrogen, sulfur, phosphorous, chlorine, and antimony wherein the percent solid add-on ranges from between about 15 to about 35, and the average char length, determined by NFPA 701 Vertical Flame Test, does not exceed about 5.5 inches.

6. The flame retardant composite sheet of claim 5, wherein the percent add-on ranges from between about 15 to about 25.

7. The flame retardant composite sheet of claim 5, wherein the water soluble solids are formed from a combination of phosphorus and sulfur.

8. The flame retardant composite sheet of claim 7, wherein the flame retardant water soluble solids comprise at least one compound selected from the group consisting of monoammonia phosphate, diammonium phosphate, ammonium polyphosphates, anhydrous ammonia sulfur salt, melamine, and hydrotalcite.

9. The flame retardant composite sheet of claim 8, wherein the ammonium polyphosphates and the anhydrous ammonia sulfur salt are in about a 1:1 ratio.

10. The flame retardant composite sheet of claim 5, wherein the permeable sheet is selected from the group of nonwoven fibrous webs consisting of a bonded carded web, spunbonded web, meltblown fiber web, and multi-ply fibrous web.

11. The flame retardant composite sheet of claim 5, wherein the permeable sheet is a composite made of a mixture of fibers and at least one other fiber selected from the group consisting of wood pulp and staple fibers.

12. The flame retardant composite sheet of claim 5, wherein the permeable sheet is a composite made of a mixture of fibers and at least one particulate selected from the group consisting of activated carbon, silica, and hydrocolloid.

* * * * *